United States Patent
Hsiao et al.

(10) Patent No.: US 7,627,942 B2
(45) Date of Patent: Dec. 8, 2009

(54) METHOD FOR USING CVD PROCESS TO ENCAPSULATE COIL IN A MAGNETIC WRITE HEAD

(75) Inventors: Richard Hsiao, San Jose, CA (US); Wipul Pemsiri Jayasekara, Los Gatos, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 502 days.

(21) Appl. No.: 11/090,457

(22) Filed: Mar. 25, 2005

(65) Prior Publication Data

US 2006/0215313 A1  Sep. 28, 2006

(51) Int. Cl.
*G11B 5/17* (2006.01)

(52) U.S. Cl. ............. 29/603.23; 29/603.25; 29/603.12; 360/123.18; 360/123.25; 360/123.46

(58) Field of Classification Search ............. 29/603.23, 29/603.25, 603.12, 603.15, 841; 360/123, 360/126, 123.18, 123.25, 123.46, 123.49; 427/255.28, 255.37; 438/287
See application file for complete search history.

(56) References Cited

U.S. PATENT DOCUMENTS

| | | | | |
|---|---|---|---|---|
| 5,878,481 A * | 3/1999 | Feng et al. | ............... | 29/603.15 |
| 6,191,918 B1 * | 2/2001 | Clarke et al. | ................ | 360/126 |
| 6,333,841 B1 * | 12/2001 | Sasaki | .................... | 360/126 X |
| 6,578,252 B2 * | 6/2003 | Sasaki | ................ | 29/603.23 X |
| 6,660,597 B2 * | 12/2003 | Furukawa et al. | ........... | 438/287 |
| 6,693,769 B2 * | 2/2004 | Hsu et al. | ........... | 360/123.49 X |
| 2003/0135986 A1 | 7/2003 | Eschbach et al. | | |
| 2003/0204952 A1 | 11/2003 | Crue et al. | | |
| 2004/0085684 A1 | 5/2004 | Basra et al. | | |

FOREIGN PATENT DOCUMENTS

JP  11-204352  *  7/1990

OTHER PUBLICATIONS

Cosnier et al, "Infrared Interface Analysis of High-K Dielectrics Deposited by Atomic Layer Chemical Vapour Deposition", IWGI 2001, Extended Abstracts of International Workshop on Gate Insulator 2001, Nov. 2001, pp. 226-229.*
M. Ritala, et al. "Atomic Layer Deposition," from *Handbook of Thin Film Materials*, ed. H.S. Nalwa, Academic Press 2001, vol. 1, chapt. 2.

* cited by examiner

*Primary Examiner*—A. Dexter Tugbang
(74) *Attorney, Agent, or Firm*—G. Marlin Knight

(57) ABSTRACT

A method for fabricating a magnetic write head with a coil with a high aspect ratio using a Chemical Vapor Deposition process such as Atomic Layer Deposition (ALD), High Speed ALD, Plasma Enhanced ALD (PEALD), Plasma Enhanced Chemical Vapor Deposition (PECVD) or Low Pressure Chemical Vapor Deposition (LPCVD) to form encapsulating films over the coils without voids is disclosed. Materials which can be used for encapsulation include $Al_2O_3$, $SiO_2$, AlN, $Ta_2O_5$, $HfO_2$, $ZrO_2$, and $YtO_3$. The use of an ultra-conformal deposition process allows the pitch of the coils to be smaller than it is possible in the prior art. The method also allows materials with a smaller coefficient of thermal expansion than hardbake photoresist to be used with resulting improvements in thermal protrusion characteristics.

9 Claims, 3 Drawing Sheets

METHOD FOR USING CVD PROCESS TO ENCAPSULATE COIL IN A MAGNETIC WRITE HEAD

FIELD OF THE INVENTION

The invention relates to the field of magnetic transducers (heads) having inductive write heads and more particularly to the structure of and the process for making the pole pieces for the write head.

BACKGROUND OF THE INVENTION

In a typical prior art magnetic disk recording system a slider containing magnetic transducers for reading and writing magnetic transitions flies above the disk while it is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. Perpendicular magnetic recording is considered to be superior to longitudinal magnetic recording for ultra-high density magnetic recording. The increase demand for higher areal density has correspondingly led to increase demand to explore ways to reduce the width of the write pole piece, increase the write field strength, and improve the write field gradient.

In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The area of the main pole piece facing the air-bearing surface is designed to be much smaller than the area of the return pole piece. The shape and size of the main pole and any shields are the primary factors in determining the track width. FIG. 1(A) illustrates a prior art disk drive 10 with a head 20 for reading and writing transitions on the associated disk 16 which comprises the thin films of the magnetic recording media 17 which are deposited on substrate 18. The write head is inductive and includes a coil 31 and pole pieces P1 and P2. The section taken is perpendicular to the air-bearing surface. The read and write elements of the head (also called a slider) are built-up in layers on a wafer using thin film processing techniques to form a large number of heads at the same time. Conventionally after the basic structures for the heads have been formed the individual heads (original) rows of heads are cut from the wafer to expose what will become the air-bearing surface after further processing. The processing of the air-bearing surface typically includes lapping and formation of air-bearing features typically called rails. The air-bearing features separate the active components of the head from the air-bearing surface which is further separated from the media by an air gap.

Conventionally the coil 31 for the inductive write head is fabricated from copper and then encapsulated in hard bake photoresist which requires baking at a temperature of 230 degrees C. or more. This temperature limits the materials and designs that can be used for the magnetic sensor. The hard-bake material also has a thermal expansion characteristic which is a poor match for the other materials in the head. In addition, for high aspect ratio coils, where the height of the coil is several times the spacing (pitch) between the coil turns other fill techniques such as sputtering can result in undesirable voids between the coil turns. FIG. 1(B) illustrates such a problem where coil 31 and pole piece 35 have been patterned. Sputtered material 34 applied to the relatively deep, narrow trenches between the coil turns can result in "pinch-off" areas 36 where the sidewall deposition grows together near the top of the trench before the bottom of the trench has been filled resulting in voids.

In US patent application 20030204952 by Crue, et al. a recording head is described with inorganic, electrically insulating materials within the recording head. The insulating materials are vacuum deposited, with no need to use a hard bake process that would be required for use of organic insulators. In one embodiment, the write gap is first masked, and then the coil is deposited on the write gap. A slightly larger area is then exposed within the mask, permitting insulation to be deposited over the coil. In a second embodiment, the coil and associated insulation are deposited and then milled to have a tapered configuration.

SUMMARY OF THE INVENTION

Applicant discloses a method for fabricating a magnetic write head with a coil with a high aspect ratio using a Chemical Vapor Deposition process such as Atomic Layer Deposition (ALD), High Speed ALD, Plasma Enhanced ALD (PEALD), Plasma Enhanced Chemical Vapor Deposition (PECVD) or Low Pressure Chemical Vapor Deposition (LPCVD) to form encapsulating films over the coils without voids. Materials which can be used for encapsulation include $Al_2O_3$, $SiO_2$, AlN, $Ta_2O_5$, $HfO_2$, $ZrO_2$, and $YtO_3$. The use of an ultra-conformal deposition process allows the pitch of the coils to be smaller than it is possible in the prior art. The method according to the invention also allows materials with a smaller coefficient of thermal expansion than hardbake photoresist to be used with resulting improvements in thermal protrusion characteristics.

DETAILED DESCRIPTION OF THE INVENTION AND THE PREFERRED EMBODIMENTS

Figure 1A:
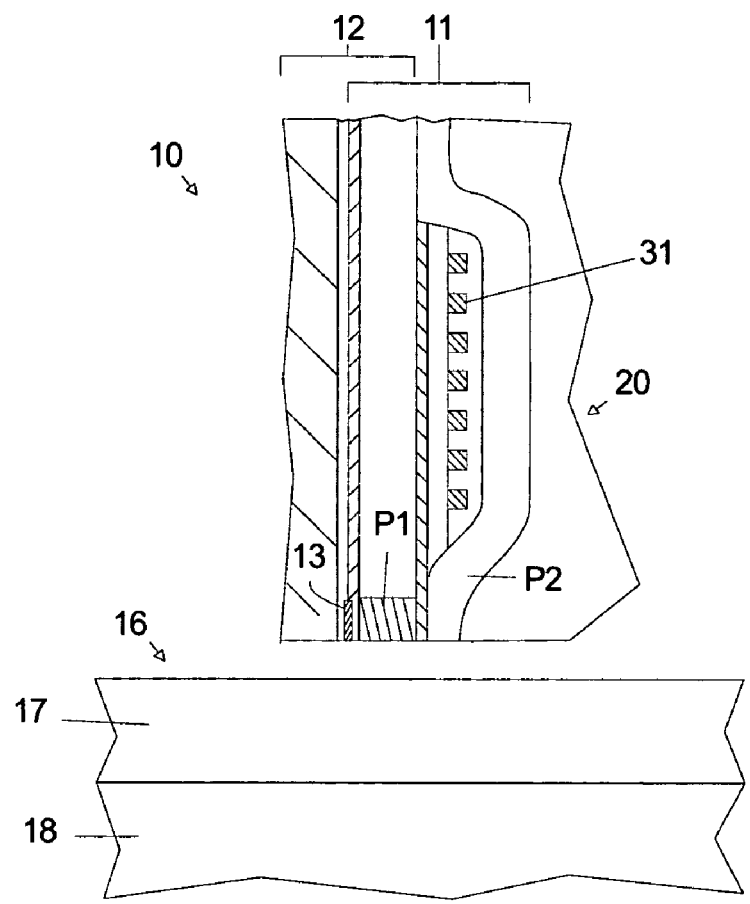
FIG. 1(A) is an illustration of selected components of a prior art disk drive in which the head fabricated according to the invention can be embodied, as viewed in a section taken perpendicular to the air-bearing surface.
Figure 1B:
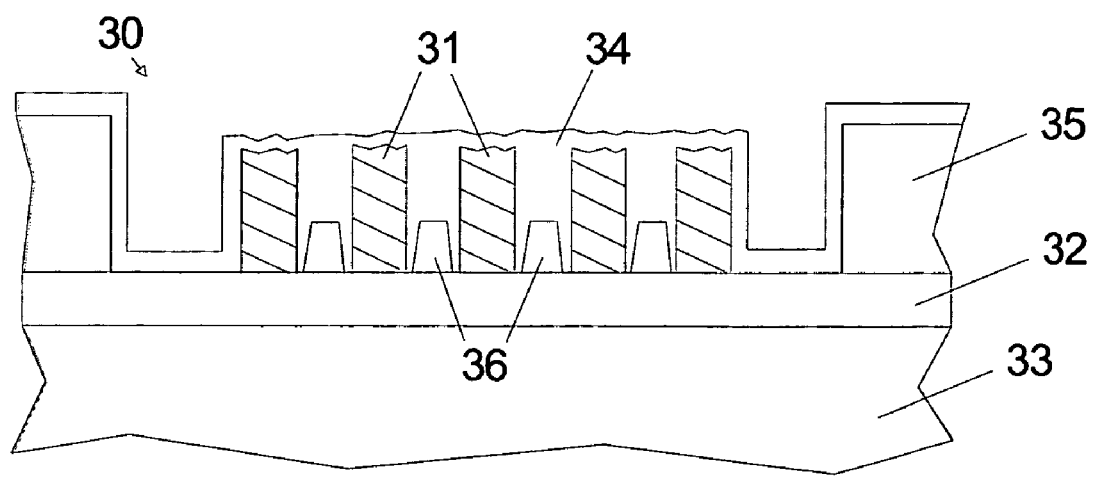
FIG. 1(B) is an illustration of a prior art process for forming a coil for an inductive write head.

It is conventional for thousands of heads to be manufactured simultaneously on a single wafer. For simplicity the following will describe the actions or structures for a single head, but it is to be understood that the process steps are performed over the entire wafer and are, therefore, forming structures for thousands of heads simultaneously. The invention relates to the write head portion of the magnetic transducer and does not place limits on the type of read head that can be used with it. Typically the read head portion of the transducer is fabricated first, but transducers with the write head portion fabricated first have been described in the prior art. A write head according to the invention may be fabricated before or after the read head portion of the transducer.

The relative sizes of the components shown in the figures are not presented according to scale, since the large range of sizes would make the drawings unclear. The relative sizes/thickness of the components are according to prior art principles except where noted below. The hatching lines are not intended to represent the material composition of a structure, but are used only to distinguish structures and aid in the explanation of the process of making the write head.

Atomic Layer Deposition (ALD) is a preferred method of deposition according to the invention and even more preferred is the high speed ALD which is commercially available. Such a high speed ALD technique has been published by Genus, inc. in Nikkei Microelectronics p 49-56, May 2004. ALD is variety of chemical vapor deposition (CVD) which is surface controlled. Each atomic layer formed in the sequential process is a result of controlled chemical reactions which saturate the surface. The chemical reaction between the volatile precursor and the surface (chemisorption) is controlled by the reaction temperature so that the precursors are not allowed to condense or decompose on the surface, but the precursor levels are kept high enough for surface saturation. For binary compounds such as metal oxides, a reaction cycle consists of two reaction steps. First the metal compound precursor is allowed to react with the surface, the system is purged and then the surface is exposed to an oxygen precursor. Plasma Enhanced Chemical Vapor Deposition (PECVD) is a technique in which one or more gaseous reactors are used to form a solid insulating or conducting layer on the surface of a wafer under low pressure, plasma and/or high temperature conditions.

Materials which can be used for encapsulation include alumina ($Al_2O_3$), silicon dioxide ($SiO_2$), AlN, $Ta_2O_5$, $HfO_2$, $ZrO_2$, and $YtO_3$. The use of materials such as alumina or silicon dioxide will reduce the thermal expansion in comparison to a head in which hardbake is used as the encapsulation material. The encapsulation materials according to the invention have a lower coefficient of thermal expansion and result a lower mismatch with the other head material which in turn is believed to reduce the thermal protrusion of the head during write operations.

Figure 2:
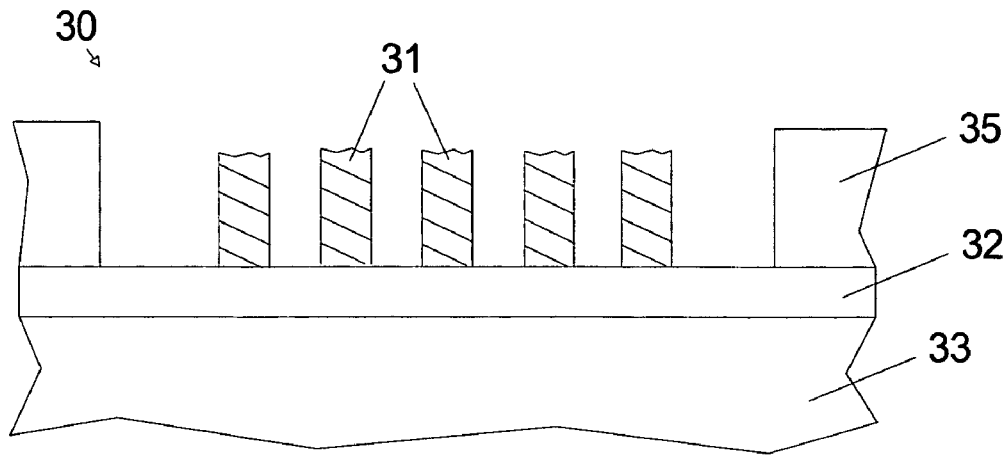
FIG. 2 is an illustration of an initial stage of a process according to the invention.
Figure 3:
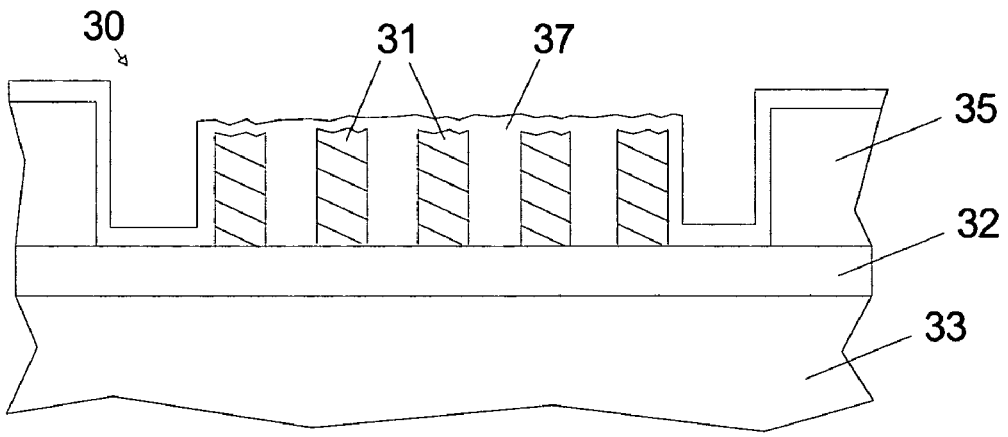
FIG. 3 is an illustration of a stage of a process according to the invention subsequent to the stage shown in FIG. 2.

Reference is made to FIG. 2 to begin the description of a first embodiment of the invention. The section view is perpendicular to the surface of the thin films on wafer 30. In this embodiment the read head has been manufactured first and is included in the collection of layers 33. Subsequent to the read head, the coils 31 have already been deposited on an insulating layer 32 at the stage shown the process has been followed according to the prior art except that the separation between the coil turns (the pitch) is smaller than is possible using the prior art. FIG. 3 illustrates the next stage of the process after the ultra-conformal fill 37 has been deposited by a low temperature process such as ALD. Even though the fill 37 is ultra-conformal, the gaps between the turns of the coil 37 as so narrow that they will be filled in completely by this process, but the pinch voids will not be formed.

Figure 4:
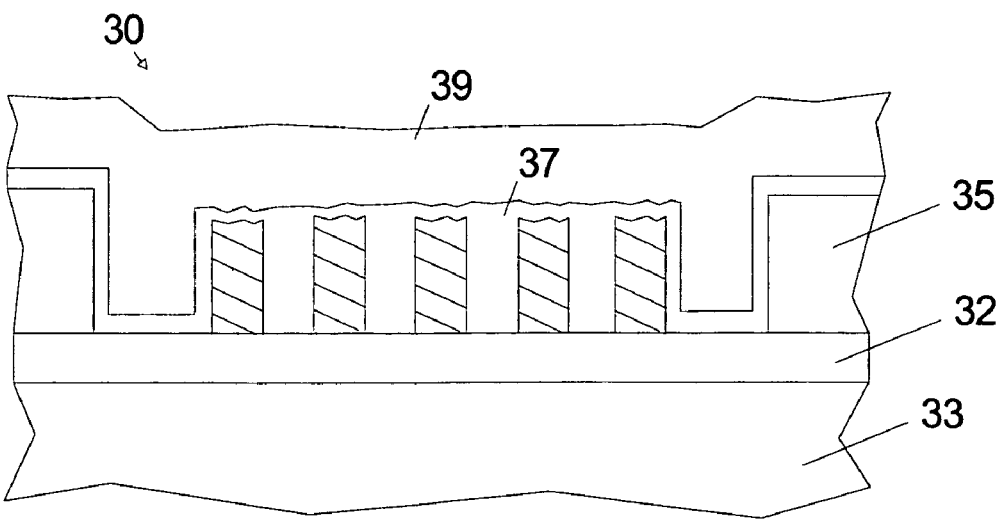
FIG. 4 is an illustration of a stage of a process according to the invention subsequent to the stage shown in FIG. 3.
Figure 5:
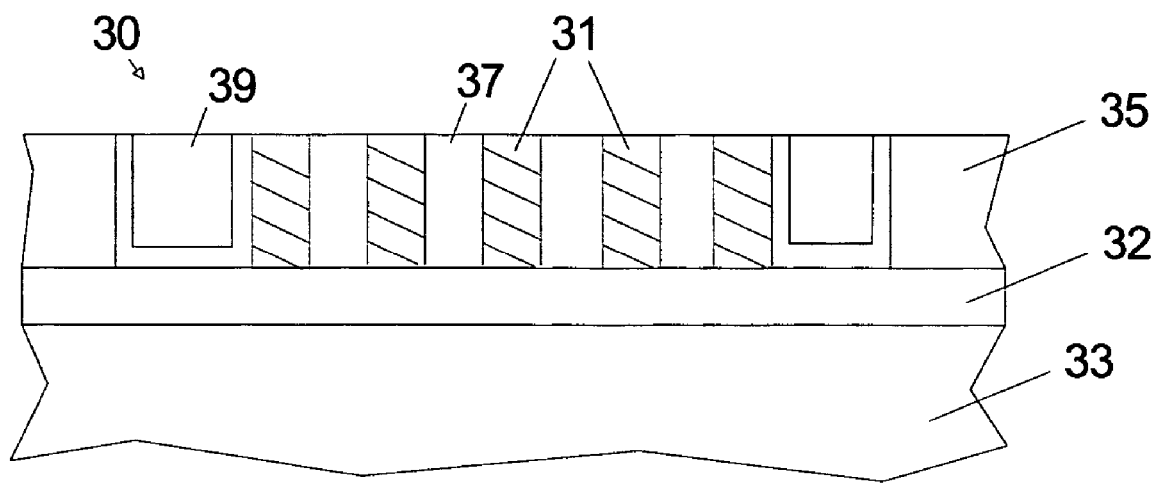
FIG. 5 is an illustration of a stage of a process according to the invention subsequent to the stage shown in FIG. 4.

FIG. 4 illustrates the next stage of the process after nonconformal fill 39 has been deposited by a conventional process such as sputtering. The fill 39 is deposited to a sufficient thickness to fill the wafer above the target level for chemical-mechanical planarization (CMP). FIG. 5 shows the wafer planarization down to the target level which exposes the tops of the coil turns.

Other variations and embodiments according to the invention will be apparent to those skilled in the art which will nevertheless be with the spirit and scope of the invention.

What is claimed is:

1. A method of fabricating a thin film magnetic head on a wafer comprising:

patterning turns of a coil on a surface, the turns of the coil having a first thickness;

depositing an encapsulation material on the coil by a chemical vapor deposition process comprising reacting a metal or silicon compound precursor with a surface of the coil in a system, purging the metal or silicon compound precursor from the system and then exposing the surface of the wafer to a precursor in the system to form the encapsulation material as a compound that includes the metal or silicon in addition to oxygen or nitrogen, the encapsulation material being deposited as an ultra-conforming film over the wafer with a minimum second thickness that is less than the first thickness, the encapsulation material having a third thickness between the turns of the coil and filling gaps between the turns of the coil without leaving voids, the third thickness being greater than the first thickness;

depositing an insulating material over the encapsulation material by sputtering, the insulating material having a minimum fourth thickness that is greater than the minimum second thickness filling the wafer to a predetermined level with insulating material; and planarizing the wafer exposing the encapsulation material between the turns of the coils by removing the insulating material from above the encapsulation material between the turns of the coils.

2. The method of claim 1 wherein the chemical vapor deposition process is an atomic layer deposition process.

3. The method of claim 1 wherein the encapsulation material is $YtO_3$.

4. The method of claim 1 wherein the encapsulation material is $Al_2O_3$.

5. The method of claim 1 wherein the encapsulation material is $SiO_2$.

6. The method of claim 1 wherein the encapsulation material is AlN.

7. The method of claim 1 wherein the encapsulation material is $Ta_2O_5$.

8. The method of claim 1 wherein the encapsulation material is $HfO_2$.

9. The method of claim 1 wherein the encapsulation material is $ZrO_2$.

* * * * *